United States Patent
Liu et al.

(10) Patent No.: US 10,355,601 B2
(45) Date of Patent: Jul. 16, 2019

(54) SWITCHED-MODE POWER SUPPLIES HAVING BURST MODE OPERATION FOR REDUCED POWER CONSUMPTION

(71) Applicant: Astec International Limited, Kowloon (HK)

(72) Inventors: Jun Liu, Shenzhen (CN); QingFeng Liu, Shenzhen (CN); Xun Gong, Shenzhen (CN); Zhe Li, Shenzhen (CN)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 15/754,547

(22) PCT Filed: Mar. 31, 2017

(86) PCT No.: PCT/CN2017/079126
§ 371 (c)(1),
(2) Date: Feb. 22, 2018

(87) PCT Pub. No.: WO2018/176423
PCT Pub. Date: Oct. 4, 2018

(65) Prior Publication Data
US 2018/0375437 A1   Dec. 27, 2018

Related U.S. Application Data
(63) Continuation of application No. PCT/CN2017/079126, filed on Mar. 31, 2017.

(51) Int. Cl.
*H02M 3/335* (2006.01)
*H02M 1/08* (2006.01)
(Continued)

(52) U.S. Cl.
CPC ......... *H02M 3/33515* (2013.01); *H02M 1/08* (2013.01); *H02M 3/33523* (2013.01);
(Continued)

(58) Field of Classification Search
CPC ...... H02M 3/156; H02M 3/157; H02M 3/315; H02M 3/33507; H02M 3/335;
(Continued)

(56) References Cited

U.S. PATENT DOCUMENTS

| | | | | |
|---|---|---|---|---|
| 8,339,813 B2 * | 12/2012 | Wang | ........ | H02M 1/4225 363/21.02 |
| 9,246,391 B2 * | 1/2016 | Berghegger | ...... | H02M 3/33507 |
| 9,853,553 B2 * | 12/2017 | Zhang | ......... | H02M 3/33523 |
| 9,866,133 B2 * | 1/2018 | Kha | ......... | H02M 3/33523 |
| 9,960,665 B2 * | 5/2018 | Boncato | ......... | H02M 1/32 |
| 9,991,799 B2 * | 6/2018 | Liu | ......... | H02M 3/33507 |

(Continued)

OTHER PUBLICATIONS

TPS61098x Ultra-Low Quiescent Current Synchronous Boost with Integrated LDO/Load Switch, Texas Instruments Incorporated, Jun. 2015 (42 pages).

(Continued)

*Primary Examiner* — Adolf D Berhane
(74) *Attorney, Agent, or Firm* — Harness, Dickey & Pierce, P.L.C.

(57) ABSTRACT

According to some aspects of the present disclosure, switched-mode power converters and control methods are disclosed. Example power converters include an input terminal, an output terminal, and a transformer coupled between the input terminal and the output terminal. The transformer includes a primary winding and a secondary winding. The power supply also includes at least one switch coupled to the primary winding, and a primary controller coupled to the at least one switch to control switching operation of the at least one switch. The primary controller (Continued)

includes a voltage reference. The power supply further includes a secondary controller configured to detect a no load condition at the output terminal, and operate the primary controller in a burst mode by adjusting the voltage reference of the primary controller when the secondary controller detects the no load condition at the output terminal.

25 Claims, 6 Drawing Sheets

(51) Int. Cl.
  *H02M 1/00* (2006.01)
  *H02M 3/158* (2006.01)
(52) U.S. Cl.
  CPC .. *H02M 3/1588* (2013.01); *H02M 2001/0025* (2013.01); *H02M 2001/0035* (2013.01); *Y02B 70/16* (2013.01)
(58) Field of Classification Search
  CPC ......... H02M 3/33515; H02M 3/33523; H02M 3/1588; H02M 1/08; H02M 2001/0035; G05F 1/30
  See application file for complete search history.

(56) References Cited

U.S. PATENT DOCUMENTS

| | | | |
|---|---|---|---|
| 2008/0084723 A1* | 4/2008 | Balakrishnan | H02M 3/335 363/97 |
| 2012/0235658 A1* | 9/2012 | Liu | H02M 3/33507 323/282 |
| 2012/0236605 A1* | 9/2012 | Chen | H02M 3/33592 363/21.18 |
| 2013/0250627 A1* | 9/2013 | Herfurth | H02M 3/3376 363/21.15 |
| 2014/0268955 A1 | 9/2014 | Telefus | |
| 2016/0181935 A1* | 6/2016 | Kikuchi | H02M 3/33592 363/21.14 |

OTHER PUBLICATIONS

Shah, Ravi S. and Guan, Steven, Overview and Solutions for USB Type-C and Power Delivery, ARM TechCon, Nov. 11, 2015 (60 pages).

* cited by examiner

SWITCHED-MODE POWER SUPPLIES HAVING BURST MODE OPERATION FOR REDUCED POWER CONSUMPTION

FIELD

The present disclosure relates to switched-mode power supplies having burst mode operation for reduced power consumption, including USB Type-C power delivery (PD) chargers having a burst mode of operation for reduction of standby power consumption.

BACKGROUND

This section provides background information related to the present disclosure which is not necessarily prior art.

When a device is connected to a USB Type-C charger/adapter, the USB Type-C charger/adapter keeps the output voltage at an approximately fixed value. However, USB Type-C chargers/adapters commonly do not have a device connected. This may be considered a standby mode of the charger/adapter. In some applications, it is critical for the charger/adapter to have very low power consumption during standby mode.

Some power supplies operate in a burst mode by using an analog error amplifier to operate a pulse-width modulated (PWM) controller at a maximum duty cycle to increase an output voltage of the power supply, and turning the PWM controller on and off as the output voltage cycles between minimum and maximum values.

SUMMARY

This section provides a general summary of the disclosure, and is not a comprehensive disclosure of its full scope or all of its features.

According to one aspect of the present disclosure, a switched-mode power supply includes an input terminal for receiving an input voltage, an output terminal for providing an output voltage to a load, and a transformer coupled between the input terminal and the output terminal. The transformer includes a primary winding and a secondary winding. The power supply also includes at least one switch coupled to the primary winding, and a primary controller coupled to the at least one switch to control switching operation of the at least one switch. The primary controller includes a voltage reference. The power supply further includes a secondary controller configured to detect a no load condition at the output terminal, and operate the primary controller in a burst mode by adjusting the voltage reference of the primary controller when the secondary controller detects the no load condition at the output terminal.

According to another aspect of the present disclosure, a method of operating a switched-mode power supply is disclosed. The power supply includes an input terminal for receiving an input voltage, an output terminal for providing an output voltage to a load, and a transformer coupled between the input terminal and the output terminal and having a primary winding and a secondary winding. The power supply also includes at least one switch coupled to the primary winding, and a primary controller coupled to the at least one switch. The primary controller includes a voltage reference. The power supply further includes a secondary controller. The method includes detecting, by the secondary controller, a no load condition at the output terminal. When the no load condition is detected at the output terminal, the method includes operating the primary controller in a burst mode by adjusting the voltage reference of the primary controller.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding features throughout the several views of the drawings.

DETAILED DESCRIPTION

Figure 1:
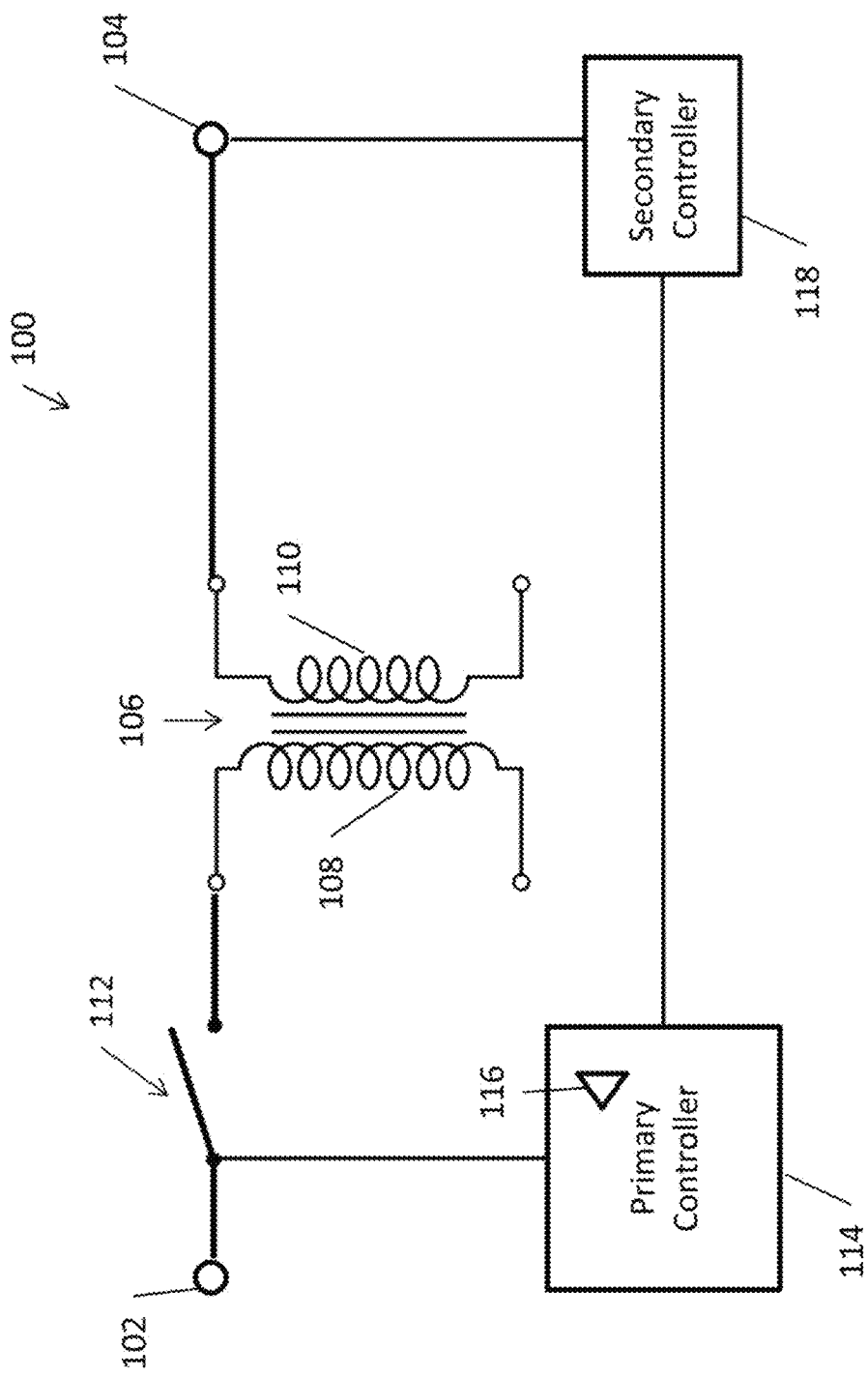
FIG. 1 is a circuit diagram of a switched-mode power supply according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A switched-mode power supply according to one example embodiment of the present disclosure is illustrated in FIG. 1 and indicated generally by reference number 100. As shown in FIG. 1, the switched-mode power supply 100 includes an input terminal 102 for receiving an input voltage, and an output terminal 104 for providing an output voltage to a load. A transformer 106 has a primary winding 108 and a secondary winding 110. The transformer 106 is coupled between the input terminal 102 and the output terminal 104.

The power supply 100 includes a switch 112 coupled to the primary winding 108. A primary controller 114 is coupled to the switch 112 and configured to control switching operation of the switch 112. The primary controller 114 includes a voltage reference 116.

A secondary controller 118 is configured to detect a no load condition at the output terminal 104. The secondary controller 118 is configured to operate the primary controller 114 in a burst mode by adjusting the voltage reference 116 of the primary controller 114 when the secondary controller 118 detects the no load condition at the output terminal 104.

The secondary controller 118 may operate the primary controller 114 in the burst mode by adjusting the voltage reference 116 of the primary controller 114 to increase the output voltage at the output terminal 104 to an upper burst threshold value. For example, the secondary controller 118 may increase the voltage reference 116 of the primary controller 114 so the primary controller 114 operates switch 112 to increase the output voltage at the output terminal 104 to a higher value (e.g., the upper burst threshold value, etc.). In some embodiments, the secondary controller 118 may adjust the voltage reference 116 of the primary controller 114 to substantially the same value as the upper burst threshold value.

The upper burst threshold value may be an output voltage value that is greater than a normal operating output voltage value of the power supply 100 when a load is coupled to the output terminal 104. For example, the upper burst threshold value may be about a maximum allowable (e.g., rated, etc.) voltage of the power supply 100. In some embodiments, the upper burst threshold value may be about five volts, about ten volts, about twenty volts, about fifty volts, about one hundred volts, etc.

After the output voltage at the output terminal 104 reaches the upper burst threshold value, the secondary controller 118 is configured to turn off the primary controller 114. For example, the secondary controller 118 may cut off a supply voltage pin (e.g., VCC, etc.) of the primary controller 114. This can reduce power consumption by the primary controller 114, the switch 112, other circuit components coupled to the primary controller 114 and/or switch 112, etc.

While the primary controller 114 is turned off (e.g., via the secondary controller 118), the output voltage at the output terminal 104 will gradually reduce. The rate of output voltage reduction can depend on the voltage storage capacity of the secondary (e.g., output) side of the power supply 100, which may be based on a capacitance of the secondary (e.g., output) side of the power supply 100, etc.

After the output voltage at the output terminal 104 reduces to a lower burst threshold value, the secondary controller 118 turns on the primary controller 114 (e.g., by turning on the supply voltage pin of the primary controller 114, etc.). The lower burst threshold value may be about the same value as a normal operating output voltage value of the power supply 100. In some embodiments, the lower burst threshold value may be about 3.3 volts, about five volts, about twelve volts, about twenty four volts, about forty eight volts, etc.

The primary controller 114 may then increase the output voltage at the output terminal 104 back to the upper burst threshold value, at which point the secondary controller 118 can again turn off the primary controller 114. This cycle of turning on the primary controller 114 when the output voltage reaches the lower burst threshold value and turning off the primary controller 114 when the output voltage reaches the upper burst threshold voltage value may be repeated continuously to operate the primary controller 114 in a burst mode.

The burst mode operation of primary controller 114 may continue until the secondary controller 118 detects a load condition at the output terminal 104. Upon detecting a load condition at the output terminal 104, the secondary controller 118 may adjust the voltage reference 116 of the primary controller 114 to cause the primary controller 114 to reduce the output voltage at the output terminal 104 to a normal operating output voltage value of the power supply 100.

For example, the secondary controller 118 may adjust the voltage reference 116 of the primary controller 114 to cause the primary controller 114 to reduce the output voltage at the output terminal 104 to about the lower burst threshold value, so that the power supply 100 can supply normal operating voltage to the detected load. In some embodiments, the secondary controller 118 may adjust the voltage reference 116 of the primary controller 114 to cause the primary controller 114 to reduce the output voltage at the output terminal 104 to a normal operating voltage before the output voltage at the output terminal 104 is supplied to the load, to avoid overvoltage damage to the load.

Figure 2:
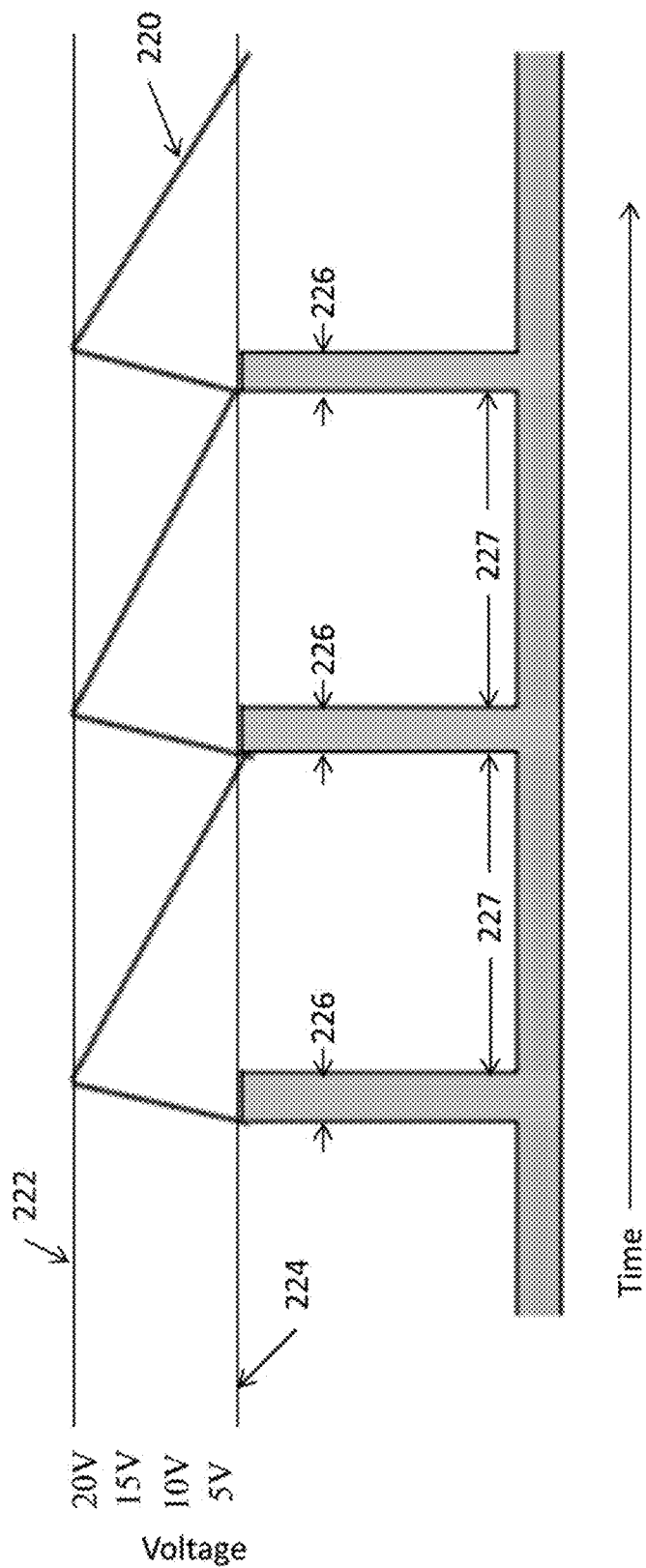
FIG. 2 is a line drawing of an example output voltage of the switched-mode power supply of FIG. 1 during a burst mode of operation.

FIG. 2 illustrates an example output voltage 220 of the power supply 100 of FIG. 1, during burst mode operation of the primary controller 114. As described above, during burst mode operation the secondary controller 118 adjusts the voltage reference 116 of the primary controller 114 to cause the primary controller 114 to increase the output voltage 220 from a lower burst threshold value 224 to an upper burst threshold value 222.

As shown in FIG. 2, the upper burst threshold value 222 is about twenty volts, and the lower burst threshold value 224 is about five volts. As should be apparent, other embodiments may use different upper burst threshold values and/or lower burst threshold values.

The primary controller 114 increases the output voltage 220 during each interval 226, while the primary controller 114 is turned on by the secondary controller 118. The intervals 226 may be referred to as wake-up periods, etc. Once the output voltage 220 reaches the upper burst threshold value 222, the secondary controller 118 turns off primary controller 114. At this point, the primary controller 114 and/or secondary controller 118 may enter a sleep period.

This causes the output voltage 220 at output terminal 104 to ramp down gradually until the output voltage reaches the lower burst threshold value 224. The gradual ramp down of the output voltage 220 is illustrated in FIG. 2 during the intervals 227, where primary controller 114 is turned off. The intervals 227 may be referred to as sleep periods. As shown in FIG. 2, the sleep period intervals 227 occur between the wake-up period intervals 226.

Once the output voltage 220 reduces to the lower burst threshold value 224, the secondary controller 118 turns on primary controller 114 for another interval 226 (e.g., wake-up period). At this point, the primary controller 114 and/or secondary controller 118 may leave a sleep state and enter a wake-up state. This causes the primary controller 114 to again increase the output voltage 220 to the upper burst threshold value 222.

Accordingly, the primary controller 114 may be operated in a burst mode so that the primary controller 114 increases the output voltage 220 at output terminal 104 to an upper burst threshold value 222 when the primary controller 114 is turned on (i.e., during the wake-up period intervals 226), and allows the output voltage 220 to ramp down to a lower burst threshold value 224 when the primary controller 114 is turned off. This cycle may be continued until a load condition at the output terminal 104 is detected by the secondary controller 118. In some embodiments, the secondary controller 118 may enter a sleep state (e.g., sleep period intervals 227) between the wake-up period intervals 226 to further reduce power consumption.

Burst mode operation of the primary controller 114 may allow for reduced (e.g., very low, minimal, etc.) power consumption by the power supply 100 when the power supply 100 is in a no load condition (e.g., standby mode, etc.). The no load condition may be any suitable condition of the power supply where a load is not connected, a load is connected but is not consuming power, etc. Increasing the output voltage to a value higher than normal operating voltage (e.g., artificially increasing the output voltage, etc.) can allow the primary controller 114 to use longer sleep periods (e.g., turn off periods, etc.) before the output voltage ramps back down to a value at which the primary controller 114 needs to be turned back on (e.g., to inhibit the output voltage from reducing below an allowed minimum value, etc.). This can reduce power consumption by the primary controller 114, any components coupled to the primary controller 114, the power supply 100, etc.

Referring again to FIG. 1, the input terminal 102 may include any suitable connector, wire, circuit node, etc. for receiving an input voltage. The source may be any suitable input voltage source, including utility mains, an alternating current (AC) source, a direct current (DC) source, etc. The source may have any suitable input voltage, including about 120 VAC, etc.

Similarly, the output terminal 104 may be any suitable connector, wire, circuit node, etc. for providing an output voltage to a load. The load may be any suitable electronic device, battery, etc. The load may demand any suitable input voltage, including about 5 VDC, about 12 VDC, etc.

The transformer 106 can have any suitable transformer construction, material, core(s), etc. The primary winding 108 includes one or more wires wound about the transformer 106, and the secondary winding 110 includes one or more wires wound about the transformer 106. As should be apparent, the primary and secondary winding(s) may include any suitable wire material, length of wire, number of turns, winding arrangements (e.g., layers, sandwich, etc.), etc.

The switch 112 may include a bipolar-junction transistor (BJT), metal-oxide-semiconductor field-effect transistors (MOSFETs), etc. The switch 112 may be connected to one or more other switches in any suitable converter arrangement, including the flyback converter topology 400 illustrated in FIG. 4, etc.

Figure 4:
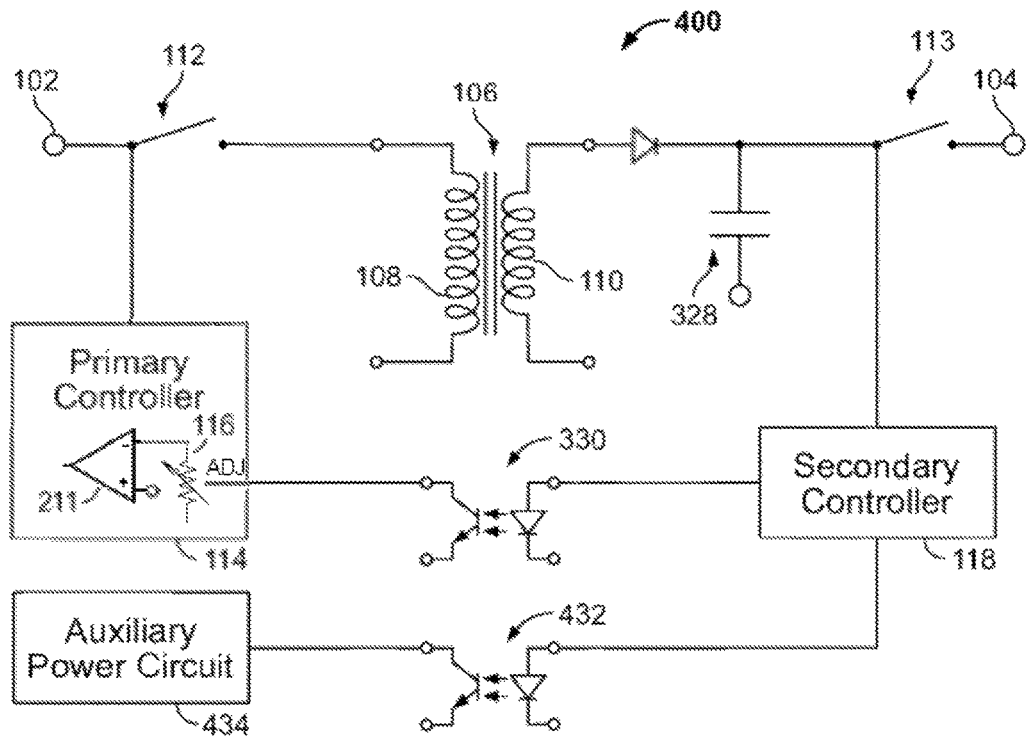
FIG. 4 is a circuit diagram of the switched-mode power supply of FIG. 3 including an auxiliary power circuit and another isolator.

The voltage reference 116 of the primary controller 114 may include an external pin of the primary controller 114 coupled to a bias reference voltage, an internal voltage reference of the primary controller 114, etc. In some embodiments, and as shown in FIG. 4, the primary controller 114 may include an error amplifier 211, and the adjustable voltage reference 116 may be coupled to the error amplifier 211.

The primary controller 114 and the secondary controller 118 may be configured to perform control operations using any suitable combination of hardware and software. For example, the primary controller 114 and the secondary controller 118 may include any suitable circuitry, logic gates, microprocessor(s), computer-executable instructions stored in memory, etc. operable to cause the primary controller 114 and the secondary controller 118 to perform actions described herein (e.g., controlling switching operation of the switch 112, operating the primary controller 114 in a burst mode, adjusting the voltage reference 116 of the primary controller 114, etc.).

Figure 3:
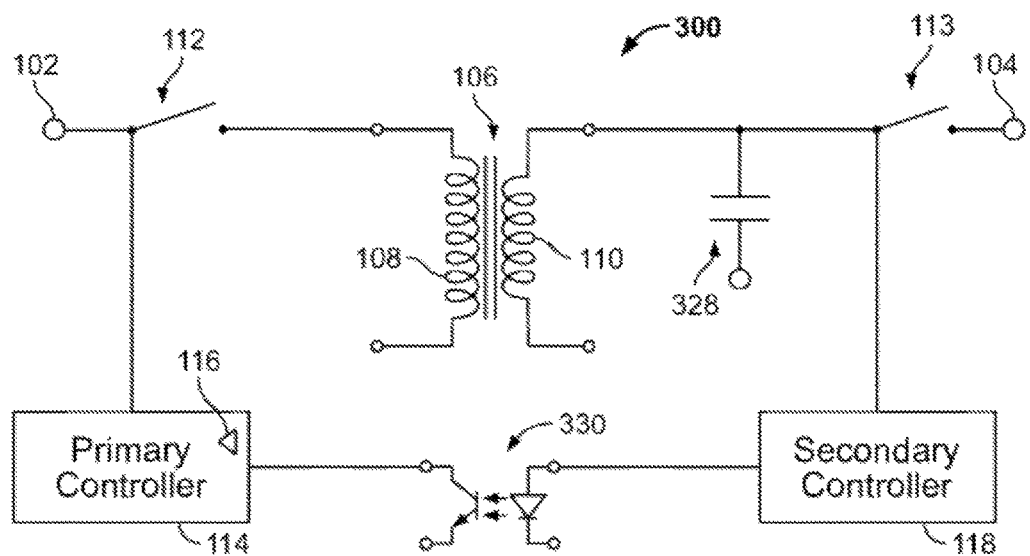
FIG. 3 is a circuit diagram of the switched-mode power supply of FIG. 1 including a capacitor and an isolator.

FIG. 3 illustrates another switched-mode power supply 300, which is similar to the power supply 100 of FIG. 1, but includes a secondary switch 112, a capacitor 328 and an isolator 330.

The secondary switch 113 (e.g., load switch) is coupled to the output terminal 104. The secondary controller 118 is coupled to the secondary switch 112 to control current flow to the output terminal 104. For example, the secondary switch 113 may isolate the output terminal 104 when a load (e.g., sink, etc.) is disconnected from the output terminal 104, etc. The secondary switch 113 may be any suitable switch capable of conducting current to the output terminal 104, including but not limited to a metal-oxide semiconductor field-effect transistor (MOSFET), a bipolar junction transistor (BJT), etc.

The capacitor 328 is coupled to store energy while the output voltage ramps down from the upper burst threshold value to the lower burst threshold value (e.g., while primary controller 114 is turned off, etc.). For example, the capacitor 328 may be coupled in front of secondary switch 113 as shown in FIG. 3. The capacitor 328 may provide power to secondary controller 118 when the power supply 300 is operating in burst mode.

The capacitor 328 may assist in reducing the ramp down rate of the output voltage to increase the period of time the primary controller 114 can remain off. Longer periods of off time of the primary controller 114 can reduce power consumption in the power supply 100. Therefore, the capacitor 328 may allow for discrete power consumption periods (e.g., turn on periods, etc.) of the primary controller 114. A burst period of the primary controller 114 may be adjusted depending on the capacitance of capacitor 328, a bandwidth of a voltage loop of the power supply 300, a rate of discharge of the capacitor 328, etc. For example, the secondary controller 118 may control the voltage loop of power supply 300, the rate of discharge of the capacitor 328, etc.

The isolator 330 is coupled between the primary controller 114 and the secondary controller 118. The isolator 330 allows the secondary controller 118 to be coupled to the primary controller 114 while maintaining isolation between primary and secondary sides of the transformer 106.

Although FIG. 3 illustrates the isolator 330 as an opto-coupler, the isolator 330 may include any element capable of transmitting a signal from the primary side to the secondary side of the transformer 106, while maintaining isolation between the primary side and the secondary side.

FIG. 4 illustrates another switched-mode power supply 400, which is similar to the power supply 300 of FIG. 3, but includes an auxiliary power circuit 434. The auxiliary power circuit 434 is configured to provide power to the primary controller 114. For example, the auxiliary power circuit 434 may include an auxiliary winding of the transformer, etc. coupled to provide power to the primary controller 114. As should be apparent, other embodiments may include other configurations of auxiliary power circuit 434.

An isolator 432 is coupled between the auxiliary power circuit 434 and the secondary controller 118. Although FIG. 4 illustrates the isolator 432 as an opto-coupler, the isolator 432 may include any element capable of transmitting a signal from the primary side to the secondary side of the transformer 106, while maintaining isolation between the primary side and the secondary side.

The secondary controller 118 may be configured to turn off the auxiliary power circuit 434 when the secondary controller 118 turns off primary controller 114. For example, a switch (e.g., MOSFET) may be coupled between the auxiliary power circuit 434 and primary controller 114, and the switch could be turned off to cut power to the primary controller 114 during sleep periods (e.g., cut off power substantially completely for reduced power consumption, etc.). Therefore, the secondary controller 118 may turn off both the primary controller 114 and the auxiliary power circuit 434 during the sleep periods of the burst mode of operation. The secondary controller 118 may be configured to turn on the auxiliary power circuit 434 when turning on the primary controller 114.

As mentioned above, the auxiliary power circuit 434 may include any suitable auxiliary power circuit of the power supply 400, including but not limited to one or more auxiliary windings of the transformer 106, circuit(s) coupled to one or more auxiliary windings of the transformer 106, other circuit(s) located on a primary side of the power supply 400, etc.

As shown in FIG. 4, an isolator 330 is coupled between the secondary controller 118 and the primary controller 114. The secondary controller 118 may transmit signal via isolator 330 to control the primary controller 114 in burst mode operation.

Isolator 432 is coupled between the secondary controller 118 and the auxiliary power circuit 434. The secondary controller 118 may transmit signals via the isolator 432 to cut off power from the auxiliary power circuit 434 to the primary controller 114 during sleep periods to further reduce energy consumption. The isolators 330 and 432 can provide electrical isolation between the primary and secondary sides of the power supply 400.

Figure 5:
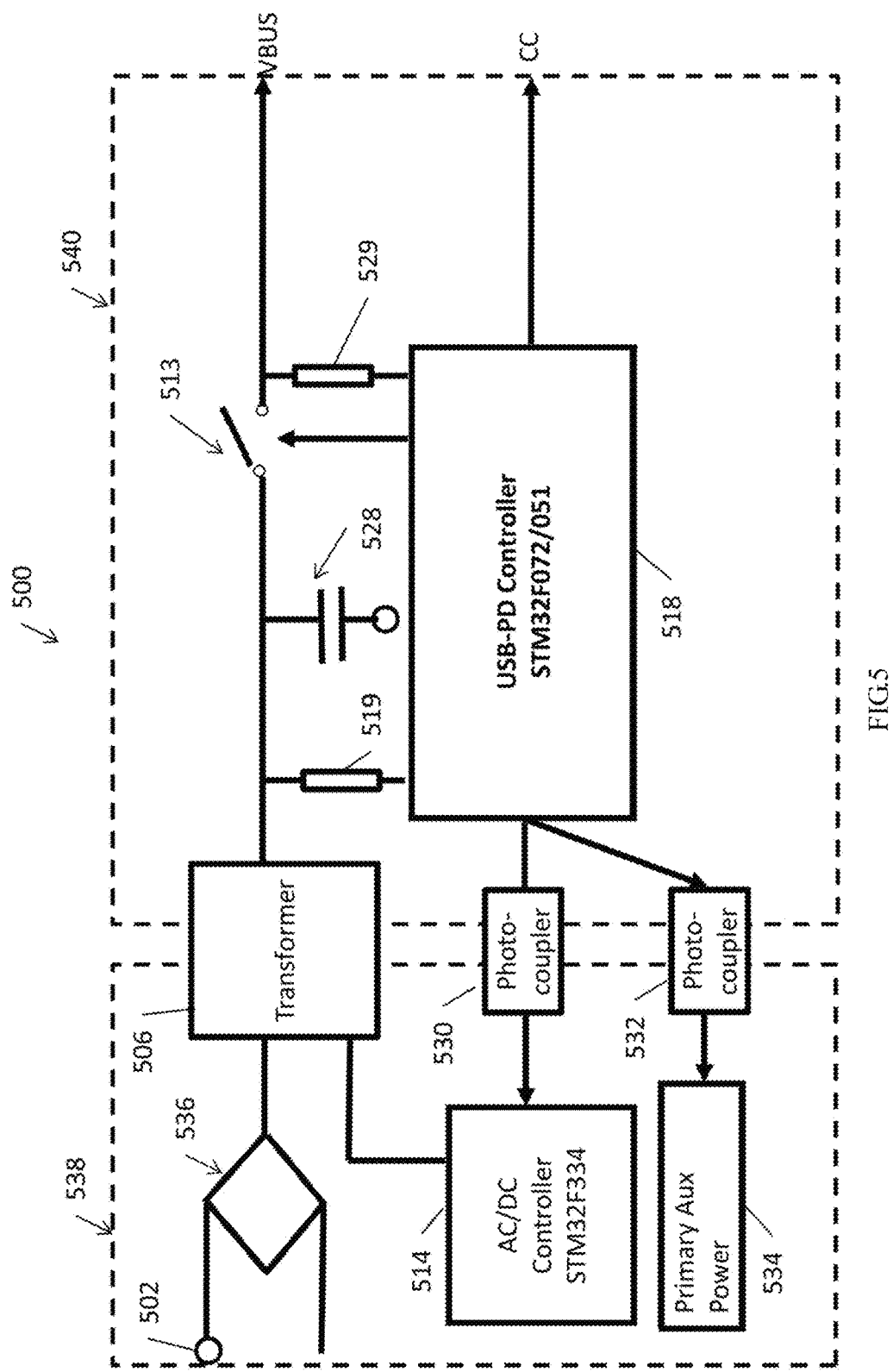
FIG. 5 is a block diagram of a USB Type-C charger power supply according to another example embodiment of the present disclosure.

In some embodiments, example power supplies described herein may include universal serial bus (USB) Type-C power supplies (e.g., chargers, adapters, USB 2.0, USB 3.0, etc.). FIG. 5 illustrates an example USB Type-C power supply 500, according to another example embodiment of the present disclosure.

As illustrated in FIG. 5, the power supply 500 includes an input terminal 502 coupled to a bridge circuit 536. The bridge circuit 536 is coupled to a transformer 506. The input terminal 502 and bridge circuit 536 are located on a primary side 538 of the power supply 500. The transformer 506 is coupled to an output terminal (VBUS) on a secondary side 540 of the power supply 500.

The primary side 538 of power supply 500 includes a primary controller 514 and an auxiliary power circuit 534. The primary controller 514 is a pulse-width modulated (PWM) AC/DC Controller. However, it should be apparent that other embodiments may include other suitable primary controllers (e.g., digital controllers, PWM controllers, etc.) without departing from the scope of the present disclosure.

A secondary controller 518 is located on the secondary side 540 of the power supply 500. The secondary controller 518 is a USB power delivery (USB-PD) controller. The secondary controller 518 includes a configuration channel (CC) which may be used for discover, configuration, management, etc. of connections across a USB Type-C cable. The secondary controller 518 may be configured to enter a sleep mode of operation during sleep periods of burst mode operation to reduce power consumption by the secondary controller 518, the power supply 500, etc. As should be apparent, other embodiments may include other suitable secondary controllers (e.g., digital controllers, PWM controllers, etc.) without departing from the scope of the present disclosure.

The secondary controller 518 is coupled to a current sensor 519 for sensing output voltage. The current sensor 519 may be any suitable element capable of sensing a voltage, including a current sense resistor, etc.

Capacitor 538 is configured to store energy (e.g., from transformer 506, etc.), and may provide power to secondary controller 518. Secondary controller 518 is coupled to secondary switch 513 to control flow of current to output (VBUS). A discharge resistor 529 is coupled to secondary switch 513 for adjusting voltage of capacitor 528 (e.g., discharging capacitor 528). For example, when a load is disconnected, voltage across capacitor 528 may increase and decrease in a burst mode of operation. When a load is connected to VBUS, discharge resistor 529 may be used to discharge voltage across capacitor 528, to bring the voltage at VBUS down to a safe level (e.g., five volts, etc.) for any load(s) connected to VBUS.

A photo-coupler 530 is coupled between the secondary controller 518 and the primary controller 514, and another photo-coupler 532 is coupled between the auxiliary power circuit 534 and the secondary controller 518. For example, the secondary controller 518 may transmit control signals through photo-coupler 530 to the primary controller 514 to operate the primary controller 514 in a burst mode, to provide feedback (e.g., digital to analog conversion (DAC), etc.) to the primary controller 514, etc. The secondary controller 518 may turn off auxiliary power circuit 534 (e.g., but turning off a switch coupled between auxiliary power circuit 534 and primary controller 114, etc.) to cut off power to the primary controller 114 during sleep periods. As should be apparent, other embodiments may include any other suitable isolators between the secondary controller 518, the primary controller 514, and the auxiliary power circuit 534.

Although not illustrated, the USB Type-C power supply 600 may include any other suitable components used for USB Type-C communication and power delivery. For example, the power supply 600 may include a downstream facing port (DFP) associated with the flow of data in a USB connection, a sink port, a source port, a Type-C port (e.g., associated with a USB Type-C receptacle and including USB signaling, CC logic, multiplexers, etc.), etc. The power supply 600 may include a USB Type-C cable (e.g., a USB 2.0 cable, USB 3.1 cable, etc.).

Figure 6A:
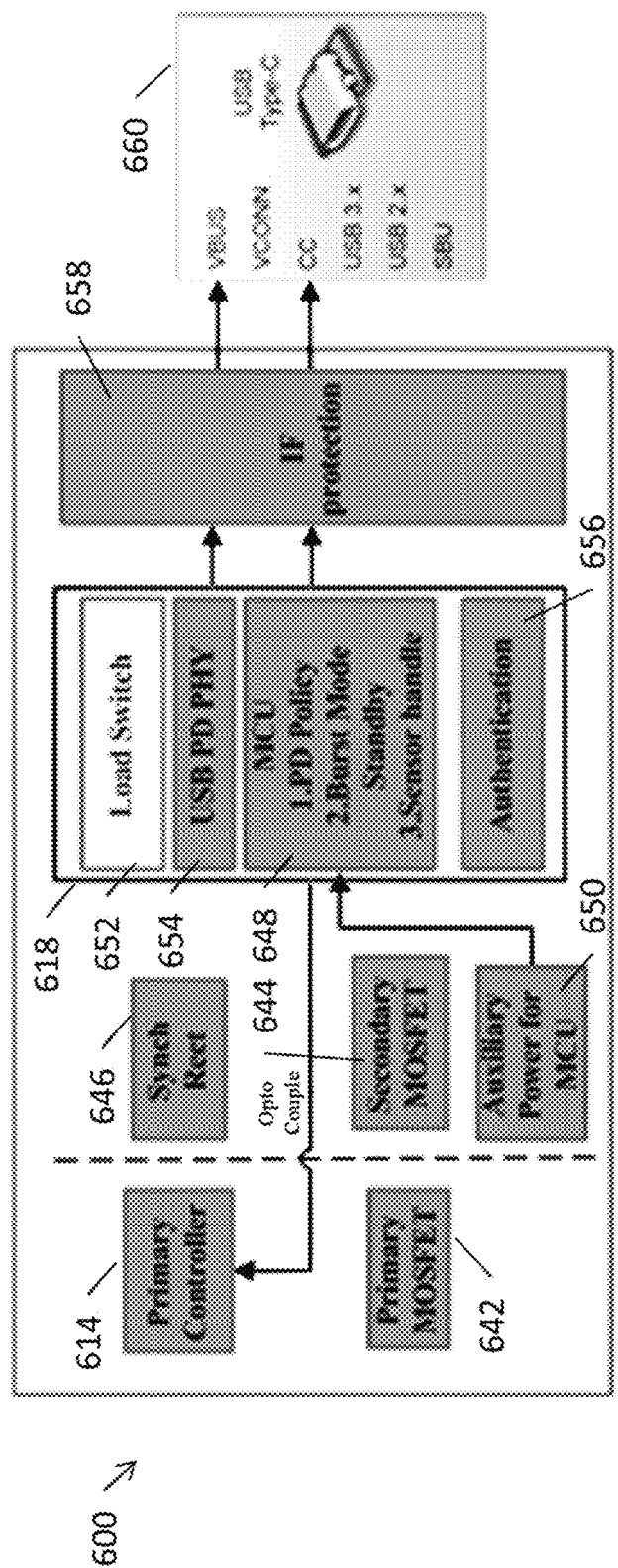
FIG. 6A is a block diagram illustrating power consumption in the power supply of FIG. 5 during a turn on period of the primary controller.

FIG. 6A illustrates a USB Type-C power supply 600 during an on period of burst mode operation. During the on period, the primary controller 614 is turned on and consumes power.

The power supply 600 includes a primary MOSFET 642, a secondary MOSFET 644, and a synchronous rectifier 646. During the on period of burst mode operation, the primary MOSFET 642, secondary MOSFET 644, and synchronous rectifier 646 are all turned on and consuming power.

As shown in FIG. 6A, power supply 600 includes a secondary controller 618. The secondary controller 618 includes a microcontroller unit (MCU) 648 that receives power from an auxiliary power source 650. The secondary controller 618 also includes a load switch 652, a USB PD physical layer (PHY) 654, and an authentication circuit 656. The secondary controller 618 is coupled to a protection circuit 658. The protection circuit 658 is coupled to a USB Type-C port 660.

Figure 6B:
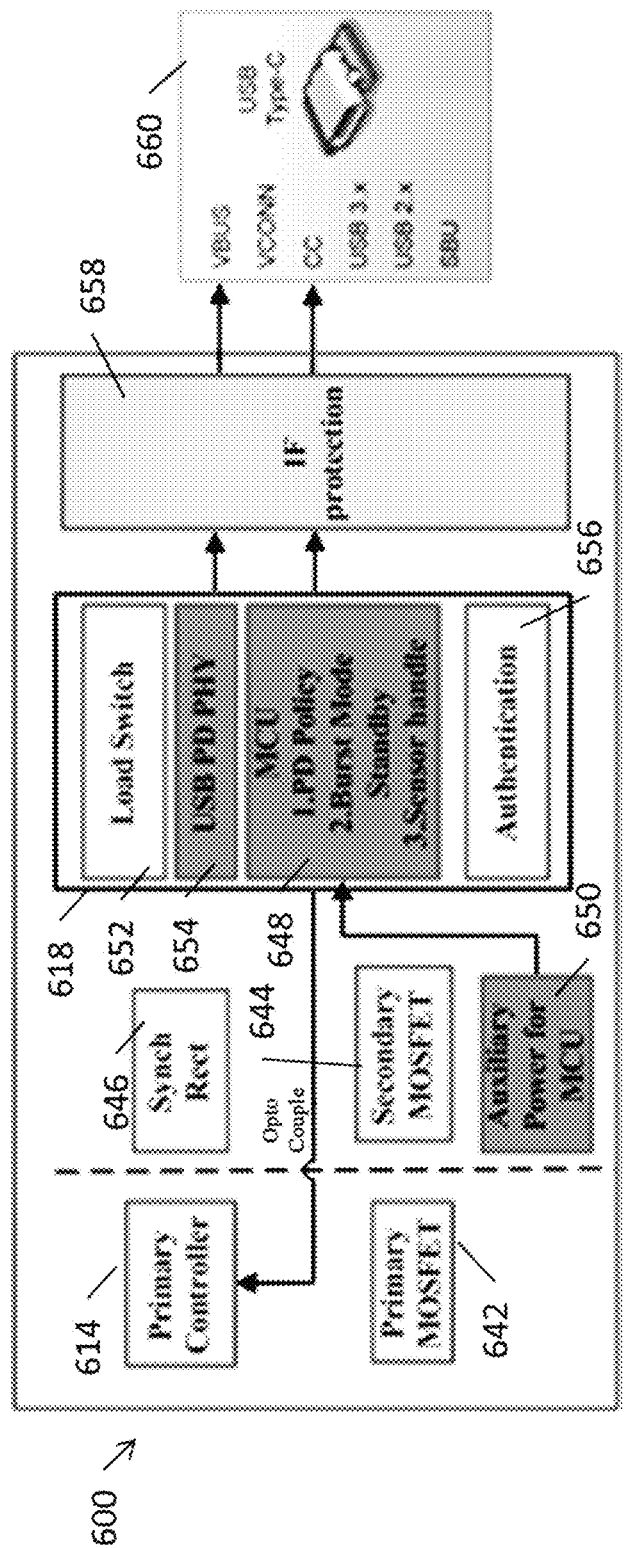
FIG. 6B is a block diagram illustrating power consumption in the power supply of FIG. 5 during a turn off period of the primary controller.

FIG. 6B illustrates the USB Type-C power supply 600 during a sleep period of burst mode operation. In contrast to the on period illustrated in FIG. 6A, during the sleep period of FIG. 6B the primary controller 614 is turned off to reduce power consumption. As shown in FIG. 6B, the primary MOSFET 642, secondary MOSFET 644, synchronous rectifier 646, authentication circuit 656 and protection circuit 658 are also turned off to reduce power consumption during the off period of burst mode operation.

Further reduction in power consumption can be achieved by placing the secondary controller 618 (including MCU-PD 648) in sleep mode along with the primary controller 614. For example, when voltage at capacitor 528 (see FIG. 5) is higher than a threshold value (e.g., twenty volts, etc.), the secondary controller 618 can enter sleep mode. However, when voltage drops to a lower threshold value (e.g., five volts, etc.), the secondary controller 618 can wake up and send a control signal to primary controller 614 to burst up the output voltage at capacitor 528. The secondary controller 618 may wake up during periods 226 illustrated in FIG. 2, and enter sleep mode during times between periods 226.

Power supplies described herein may be used in any suitable applications to reduce power consumption of the power supply. For example, power supplies described herein may be used in USB Type-C chargers/adapters for providing power to electronic devices (e.g., cellular phones, tablet computers, laptop computers, etc.) through a USB Type-C connection (e.g., a USB Type-C cable, etc.). In some embodiments, an example power supply may include a 45 W AC-DC USB Type-C charger.

The power supplies may reduce power consumption during a standby mode of the power supplies (e.g., when a charger is plugged in to a wall outlet but no load is connected or a connected load is not consuming power, etc.). The burst mode operation examples described herein may provide reduced (e.g., ultra-low) power consumption of the power supplies during the standby mode.

Some burst mode operations descried herein may be implemented completely digitally and/or using firmware. A Type-C USB PD secondary controller may be used to manage voltage burst mode of the power supply, manage primary side MOSFET control of the power supply, manage sleep and wake up periods of primary controller(s) and/or secondary controller(s), control discharge of capacitor(s) during burst mode and/or connection to a load, managing a power deliver (PD) policy of the secondary controller, etc. The secondary controller may manage the above elements during different connection arrangement of the power supply, including when a Type-C connector is attached to the power supply, detached from the power supply, attached to the power supply but not drawing current, etc.

In another embodiment, a method of operating a switched-mode power supply is disclosed. The power supply includes an input terminal for receiving an input voltage, an output terminal for providing an output voltage to a load, a transformer having a primary winding coupled to the input terminal and a secondary winding coupled to the output terminal. The power supply includes an input terminal for receiving an input voltage, an output terminal for providing an output voltage to a load, and a transformer coupled between the input terminal and the output terminal and having a primary winding and a secondary winding. The power supply also includes at least one switch coupled to the primary winding, and a primary controller coupled to the at least one switch. The primary controller includes a voltage reference. The power supply further includes a secondary controller. The method includes detecting, by the secondary controller, a no load condition at the output terminal. When the no load condition is detected at the output terminal, the method includes operating the primary controller in a burst mode by adjusting the voltage reference of the primary controller.

In some embodiments, the power supply may include a Type-C universal serial bus (USB) power charger (e.g., USB 2.0, USB 3.0, etc.). For example, the secondary controller may include a universal serial bus power delivery (USB-PD) digital controller.

Operating the primary controller in the burst mode may include adjusting the voltage reference of the primary controller to increase the output voltage at the output terminal to an upper burst threshold value. The upper burst threshold value may be about twenty volts.

Operating the primary controller in the burst mode may include turning off the primary controller after the output voltage at the output terminal reaches the upper burst threshold value, and turning on the primary controller when the output voltage at the output terminal reduces to a lower burst threshold value. The lower burst threshold value may be about five volts.

In some embodiments, the method may include, after turning off the primary controller, operating the secondary controller in a sleep mode until the output voltage at the output terminal reduces to a lower burst threshold value.

The power supply can include at least one auxiliary power circuit configured to provide power to the primary controller. In this case, the method may include turning off the auxiliary power circuit to cut off power from the auxiliary power circuit to the primary controller when the primary controller is turned off. The power supply may include a first isolator coupled between the secondary controller and the primary controller, and a second isolator coupled between the secondary controller and the at least one auxiliary power circuit.

Any of the example embodiments and aspects disclosed herein may be used in any suitable combination with any other example embodiments and aspects disclosed herein without departing from the scope of the present disclosure. For example, switched-mode power supplies described herein may implement other control methods, the control methods described herein may be implemented in other switched-mode power supplies, etc. without departing from the scope of the present disclosure.

Example embodiments and aspects of the present disclosure may provide any one or more (or none) of the following advantages: reduced power consumption (e.g., ultra-low power consumption, etc.) of USB Type-C chargers during standby mode, simplified design for reduced cost and space savings by using a USB-PD controller for advanced burst mode operation, increased power capability and density, increased efficiency during standby mode, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switched-mode power supply comprising:
an input terminal for receiving an input voltage;
an output terminal for providing an output voltage to a load;
a transformer coupled between the input terminal and the output terminal, the transformer including a primary winding and a secondary winding;
at least one switch coupled to the primary winding;
a primary controller coupled to the at least one switch to control switching operation of the at least one switch, the primary controller including a voltage reference; and
a secondary controller configured to detect a no load condition at the output terminal, and operate the primary controller in a burst mode by adjusting the voltage reference of the primary controller to increase the output voltage at the output terminal to an upper burst threshold value when the secondary controller detects the no load condition at the output terminal.

2. The power supply of claim 1, wherein the secondary controller includes a universal serial bus power delivery (USB-PD) digital controller.

3. The power supply of claim 1, further comprising an isolator coupled between the primary controller and the secondary controller.

4. The power supply of claim 1, wherein the upper burst threshold value is about twenty volts.

5. The power supply of claim 1, wherein the secondary controller is configured to turn off the primary controller after the output voltage at the output terminal reaches the upper burst threshold value, and turn on the primary controller when the output voltage at the output terminal reduces to a lower burst threshold value.

6. The power supply of claim 5, wherein the lower burst threshold value is about five volts.

7. The power supply of claim 5, wherein the secondary controller is configured to, after turning off the primary controller, operate in a sleep mode until the output voltage at the output terminal reduces to a lower burst threshold value.

8. The power supply of claim 5, further comprising a capacitor configured to store at least a portion of the output voltage while the output voltage reduces from the upper burst threshold value to lower burst threshold value.

9. The power supply of claim 5, wherein the secondary controller is configured to operate the primary controller to reduce the output voltage at the output terminal to the lower burst threshold value when the secondary controller detects a load condition at the output terminal.

10. The power supply of claim 5, further comprising at least one auxiliary power circuit configured to provide power to the primary controller, the secondary controller configured to turn off the auxiliary power circuit to cut off power supplied to the primary controller when the primary controller is turned off.

11. The power supply of claim 10, further comprising an isolator coupled between the at least one auxiliary power circuit and the secondary controller.

12. The power supply of claim 1, wherein the at least one switch and the primary controller comprise a flyback converter topology.

13. The power supply of claim 1, wherein the power supply comprises a Type-C universal serial bus (USB) power charger.

14. A switched-mode power supply comprising:
an input terminal for receiving an input voltage;
an output terminal for providing an output voltage to a load;
a transformer coupled between the input terminal and the output terminal, the transformer including a primary winding and a secondary winding;
at least one switch coupled to the primary winding;
a primary controller coupled to the at least one switch to control switching operation of the at least one switch, the primary controller including an error amplifier and a voltage reference coupled to the error amplifier; and
a secondary controller configured to detect a no load condition at the output terminal, and operate the primary controller in a burst mode by adjusting the voltage reference of the primary controller when the secondary controller detects the no load condition at the output terminal.

15. The power supply of claim 14, wherein the secondary controller includes a universal serial bus power delivery (USB-PD) digital controller.

16. The power supply of claim 14, further comprising an isolator coupled between the primary controller and the secondary controller.

17. A method of operating a power supply including an input terminal for receiving an input voltage, an output terminal for providing an output voltage to a load, a transformer coupled between the input terminal and the output terminal and having a primary winding and a secondary winding, at least one switch coupled to the primary winding, a primary controller coupled to the at least one switch and including a voltage reference, and a secondary controller, the method comprising:

detecting, by the secondary controller, a no load condition at the output terminal; and when the no load condition is detected at the output terminal, operating the primary controller in a burst mode by adjusting the voltage reference of the primary controller to increase the output voltage at the output terminal to an upper burst threshold value.

18. The method of claim 17, wherein the secondary controller includes a universal serial bus power delivery (USB-PD) digital controller.

19. The method of claim 17, wherein operating the primary controller in the burst mode includes turning off the primary controller after the output voltage at the output terminal reaches the upper burst threshold value, and turning on the primary controller when the output voltage at the output terminal reduces to a lower burst threshold value.

20. The method of claim 17, wherein the power supply comprises a Type-C universal serial bus (USB) power charger.

21. The method of claim 17, wherein the upper burst threshold value is about twenty volts.

22. The method of claim 19, wherein the lower burst threshold value is about five volts.

23. The method of claim 19, further comprising, after turning off the primary controller, operating the secondary controller in a sleep mode until the output voltage at the output terminal reduces to a lower burst threshold value.

24. The method of claim 19, wherein the power supply includes at least one auxiliary power circuit configured to provide power to the primary controller, the method further comprising turning off the auxiliary power circuit to cut off power supplied to the primary controller when the primary controller is turned off.

25. The method of claim 24, wherein the power supply includes a first isolator coupled between the secondary controller and the primary controller, and a second isolator coupled between the secondary controller and the at least one auxiliary power circuit.

\* \* \* \* \*